(12) United States Patent
Bian et al.

(10) Patent No.: US 11,385,408 B2
(45) Date of Patent: Jul. 12, 2022

(54) STACKED-WAVEGUIDE POLARIZERS WITH CONDUCTIVE OXIDE STRIPS

(71) Applicant: GLOBALFOUNDRIES U.S. Inc., Santa Clara, CA (US)

(72) Inventors: Yusheng Bian, Ballston Lake, NY (US); Won Suk Lee, Malta, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 135 days.

(21) Appl. No.: 16/849,355

(22) Filed: Apr. 15, 2020

(65) Prior Publication Data

US 2021/0325603 A1   Oct. 21, 2021

(51) Int. Cl.
*G02B 6/12*   (2006.01)
*G02B 6/126*   (2006.01)
*G02B 6/122*   (2006.01)

(52) U.S. Cl.
CPC .......... *G02B 6/126* (2013.01); *G02B 6/1228* (2013.01); *G02B 2006/12061* (2013.01)

(58) Field of Classification Search
CPC ........ G02B 6/126; G02B 6/1228; G02B 6/13; G02B 2006/12061
USPC ...................................... 385/11, 14
See application file for complete search history.

(56) References Cited

U.S. PATENT DOCUMENTS

| | | | | |
|---|---|---|---|---|
| 4,998,793 A * | 3/1991 | Henry | ..................... | G02B 6/126 385/1 |
| 5,483,609 A * | 1/1996 | Nakaya | .................. | G02B 6/126 385/11 |
| 6,169,825 B1 * | 1/2001 | Morey | .................. | G02B 6/126 385/11 |
| 6,690,871 B2 * | 2/2004 | Lee | .......................... | G02B 6/10 385/124 |
| 9,470,844 B1 | 10/2016 | Ma et al. | | |
| 10,488,590 B2 * | 11/2019 | Park | .................... | G02B 6/29352 |
| 2011/0150384 A1 * | 6/2011 | Nagarajan | .............. | G02B 6/126 385/11 |
| 2017/0075063 A1 * | 3/2017 | Brouckaert | .......... | G02B 6/2813 |
| 2017/0192171 A1 * | 7/2017 | Shi | ......................... | G02B 6/126 |

FOREIGN PATENT DOCUMENTS

| | | | | |
|---|---|---|---|---|
| JP | 1990-157730 | * | 6/1990 | ............. G02F 1/313 |
| JP | 2009-186929 | * | 9/2009 | ............... G02B 5/30 |

OTHER PUBLICATIONS

Bian et al., "Polarizers With Confinement Cladding", filed Nov. 18, 2019 as U.S. Appl. No. 16/686,782.
(Continued)

*Primary Examiner* — Robert Tavlykaev
(74) *Attorney, Agent, or Firm* — Thompson Hine LLP; Francois Pagette

(57) ABSTRACT

Structures for a polarizer and methods of forming a structure for a polarizer. A polarizer includes a first waveguide core and a layer that is positioned adjacent to a side surface of the first waveguide core. The layer is composed of a first material having a permittivity with an imaginary part that ranges from 0 to about 15. A second waveguide core is positioned over the first waveguide core. The second waveguide core is composed of a second material that is different in composition from the first material.

20 Claims, 5 Drawing Sheets

(56) References Cited

OTHER PUBLICATIONS

Daoxin Dai, Zhi Wang, Nick Julian, and John E. Bowers, "Compact broadband polarizer based on shallowly-etched silicon-on-insulator ridge optical waveguides," Opt. Express 18, 27404-27415 (2010).

X. Sun, M. Z. Alam, S. J. Wagner, J. S. Aitchison, and M. Mojahedi, "Experimental demonstration of a hybrid plasmonic transverse electric pass polarizer for a silicon-on-insulator platform," Opt. Lett. 37, 4814-4816 (2012).

Bian et al, "Hybrid vanadate waveguiding configurations for extreme optical confinement and efficient polarization management in the 'near-infrared'", Nanoscale, 2018,10, 16667-16674.

Dong Wook Kim, Moon Hyeok Lee, Yudeuk Kim, and Kyong Hon Kim, "Ultracompact transverse magnetic mode-pass filter based on one-dimensional photonic crystals with subwavelength structures," Opt. Express 24, 21560-21565 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

M. RakowsKi, C. Meagher, K. Nummy, A. Aboketaf, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Ying Huang, Shiyang Zhu, Huijuan Zhang, Tsung-Yang Liow, and Guo-Qiang Lo, "CMOS compatible horizontal nanoplasmonic slot waveguides TE-pass polarizer on silicon-on-insulator platform," Opt. Express 21, 12790-12796 (2013).

De Oliveira, R., de Matos, C. "Graphene Based Waveguide Polarizers: In-Depth Physical Analysis and Relevant Parameters" Sci Rep 5, 16949 (2015).

X. Guan, P. Xu, Y. Shi, and D. Dai, "Ultra-compact broadband TM-pass Polarizer Using a Silicon Hybrid Plasmonic Waveguide Grating," in Asia Communications and Photonics Conference 2013, OSA Technical Digest (online) (Optical Society of America, 2013), paper ATh4A.2.

Chandra Prakash et al., "Optimization of silicon-photonic crystal (PhC) waveguide for a compact and high extinction ratio TM-pass polarization filter" J. Appl. Phys. 127, 023101 (2020).

Mu, X.; Wu, S.; Cheng, L.; Fu, H., "Edge Couplers in Silicon Photonic Integrated Circuits: A Review", Published Feb. 24, 2020, Appl. Sci. 10, 1538.

* cited by examiner

US 11,385,408 B2

STACKED-WAVEGUIDE POLARIZERS WITH CONDUCTIVE OXIDE STRIPS

BACKGROUND

The present invention relates to photonics chips and, more specifically, to structures for a polarizer and methods of forming a structure for a polarizer.

Photonics chips are used in many applications and systems such as data communication systems and data computation systems. A photonics chip integrates optical components, such as waveguides, optical switches, and polarizers, and electronic components, such as field-effect transistors, into a unified platform. Among other factors, layout area, cost, and operational overhead may be reduced by the integration of both types of components.

Polarizers are a type of optical component commonly found in photonics chips. A polarizer is configured to receive laser light containing multiple modes (e.g., transverse electric (TE) mode and transverse magnetic (TM) mode) and to allow only one mode to propagate while the other mode is eliminated. Polarizers that pass the transverse magnetic mode have large footprints that consume significant layout area on the photonics chip.

Improved structures for a polarizer and methods of forming a structure for a polarizer are needed.

SUMMARY

In an embodiment of the invention, a structure includes a polarizer having a first waveguide core and a layer that is positioned adjacent to a side surface of the first waveguide core. The layer is composed of a first material having a permittivity with an imaginary part that ranges from 0 to about 15. A second waveguide core is positioned over the first waveguide core. The second waveguide core is composed of a second material that is different in composition from the first material.

In an embodiment of the invention, a method of forming a structure for a polarizer is provided. The method includes forming a first waveguide core, forming a layer that is positioned adjacent to a side surface of the first waveguide core, and forming a second waveguide core positioned over the first waveguide core. The first layer is composed of a first material having a permittivity with an imaginary part that ranges from 0 to about 15, and the second waveguide core is composed of a second material that is different in composition from the first material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
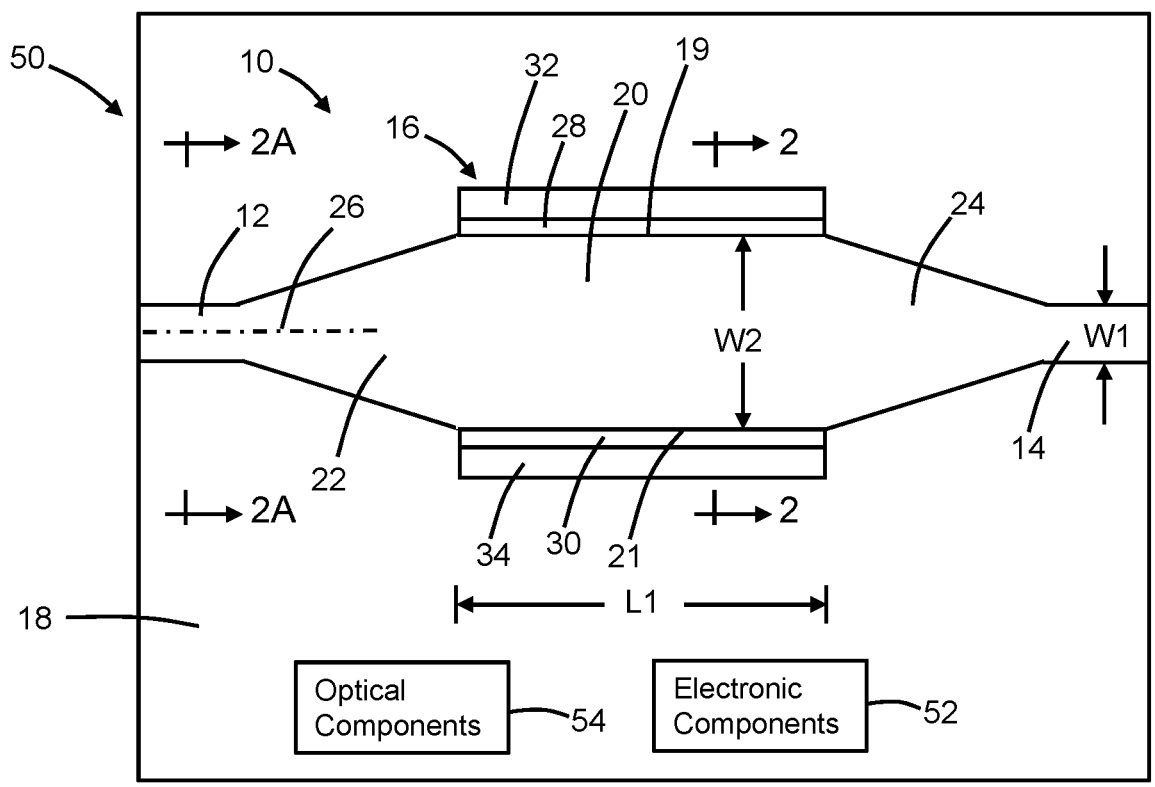
FIG. 1 is a diagrammatic top view of a photonics chip including a structure at an initial fabrication stage of a processing method in accordance with embodiments of the invention.
Figure 2:
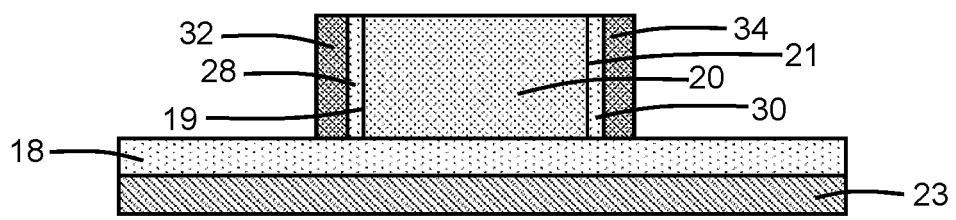
FIG. 2 is a cross-sectional view of the structure taken generally along line 2-2 in FIG. 1.
Figure 2A:
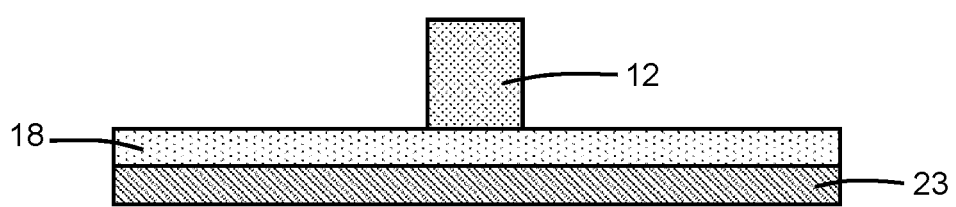
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12, a waveguide core 14, and a polarizer 16 laterally positioned between the waveguide core 12 and the waveguide core 14. The waveguide cores 12, 14 and polarizer 16 are positioned over a dielectric layer 18. The polarizer 16 includes a waveguide core 20, a taper 22 that couples the waveguide core 20 to the waveguide core 12, and a taper 24 that couples the waveguide core 20 to the waveguide core 14. The waveguide core 12, the waveguide core 20 and tapers 22, 24 of the polarizer 16, and the waveguide core 14 may extend lengthwise along a longitudinal axis 26. The waveguide core 20 and tapers 22, 24 have opposite sidewalls or side surfaces 19, 21 that merge with the opposite side surfaces of the waveguide core 12 and with the opposite side surfaces of the waveguide core 14.

The waveguide core 12, the waveguide core 20 and tapers 22, 24 of the polarizer 16, and the waveguide core 14 may be composed of a single-crystal semiconductor material, such as single-crystal silicon. In an embodiment, the single-crystal semiconductor material may originate from a device layer of a silicon-on-insulator (SOI) wafer that further includes a buried oxide layer providing the dielectric layer 18 and a substrate 23 composed of a single-crystal semiconductor material, such as single-crystal silicon. The waveguide core 12, the waveguide core 20 and tapers 22, 24 of the polarizer 16, and the waveguide core 14 may be patterned from a layer of single-crystal semiconductor material by lithography and etching processes during front-end-of-line processing. The layer of semiconductor material may be fully etched to define the waveguide core 12, the waveguide core 20 and tapers 22, 24 of the polarizer 16, and the waveguide core 14 as rib waveguides as shown or, alternatively, may be only partially etched to define ridge waveguides with a thinned layer on the dielectric layer 18. The waveguide core 12, the waveguide core 20 and tapers 22, 24 of the polarizer 16, and the waveguide core 14, which may be concurrently formed from the same layer of single-crystal semiconductor material, may have coplanar or substantially coplanar top and bottom surfaces.

The waveguide core 12 and waveguide core 14 may have a width, W1, and the waveguide core 20 associated with the polarizer 16 may have a width, W2. The taper 22 may provide a transition that flares from the smaller width, W1, of the waveguide core 12 to the larger width, W2, of the waveguide core 20 associated with the polarizer 16. The taper 24 may provide a transition that tapers from the larger width, W2, of the waveguide core 20 associated with the polarizer 16 to the smaller width, W1, of the waveguide core 14. In an alternative embodiment, the tapers 22, 24 may be omitted from the polarizer 16 such that the waveguide cores 12, 14 and the waveguide core 20 may have equal widths.

Layers 28, 32 are formed as a layer pair adjacent to the side surface 19 of the waveguide core 20 of the polarizer 16, and layers 30, 34 are formed as a layer pair adjacent to the opposite side surface 21 of the waveguide core 20 of the polarizer 16. The layer 28 is laterally positioned between the layer 32 and the side surface 19 of the waveguide core 20. The layer 30 is laterally positioned between the layer 34 and the side surface 21 of the waveguide core 20. The layers 28, 32 and layers 30, 34 extend lengthwise parallel to the longitudinal axis 26.

One end of the layers 28, 30, 32, 34 may terminate at, or approximately at, an interface defined by the intersection between the taper 22 and the waveguide core 20, and an opposite end of the layers 28, 30, 32, 34 may terminate at, or approximately at, an interface defined by the intersection between the taper 24 and the waveguide core 20 such that the layers 28, 30, 32, 34 and the waveguide core 20 have equal or approximately equal lengths, L1. In an embodiment, the layers 30, 34 and the waveguide core 20 may have equal heights relative to the dielectric layer 18. In an embodiment, the layers 30, 34 may be taller in height than the waveguide core 20. In an embodiment, the layers 30, 34 may be shorter in height than the waveguide core 20.

In an alternative embodiment, the layer 28 may be omitted such that the layer 32 is in direct contact with the side surface 19 of the waveguide core 20. In an alternative embodiment, the layer 30 may be omitted such that the layer 34 is in direct contact with the side surface 21 of the waveguide core 20. In an alternative embodiment, the layers 30, 34 may be omitted such that the side surface 21 of the waveguide core 20 is exposed and uncovered, and the polarizer 16 may only include the layers 28, 32 that are positioned adjacent to and cover the side surface 19 of the waveguide core 20.

The layers 28, 30 may be composed of a dielectric material, such as silicon dioxide, that has a lower index of refraction than the material (e.g., single-crystal silicon) of the waveguide core 20. The layers 28, 30 may be formed as sidewall spacers by depositing a conformal layer of their dielectric material over the polarizer 16, patterning the conformal layer with lithography and etching processes to remove the layers 28, 30 from areas other than the vicinity of the polarizer 16, and etching the conformally-deposited and patterned layer with an anisotropic etching process, such as reactive ion etching. The layers 28, 30 are absent from the sidewalls of the waveguide cores 12, 14 and, in the representative embodiment, also absent from the side surfaces 19, 21 of the tapers 22, 24. The layers 28, 30 may have a uniform thickness over their respective lengths in a direction parallel to the longitudinal axis 26. In the representative embodiment, the layer 28 and the layer 30 have equal thicknesses. In an alternative embodiment, the layer 28 and the layer 30 have unequal thicknesses provided by forming each separately. In an embodiment, the layers 28, 30 may be formed before the layers 32, 34 are formed. The respective bottom surfaces of the layers 28, 30 may be in direct contact with the dielectric layer 18.

The layers 32, 34 may be each composed of a material having a different composition than the materials of the layers 28, 30 and the waveguide core 20. In embodiments, the layers 32, 34 may be composed of a material with a permittivity having a real part in a range of about negative twenty (−20) to about positive twenty (+20), and an imaginary part in a range of zero (0) to about fifteen (15). In an embodiment, the layers 32, 34 may be composed of a material that is not electro-optically active such that the refractive index, which is related to permittivity, does not change with applied bias voltage. In an embodiment, the layers 32, 34 may be composed of a conductive oxide and, in an embodiment, conductive oxide may be transparent. In an embodiment, the layers 32, 34 may be composed of a metal vanadate, such as calcium vanadate or strontium vanadate. In an embodiment, the layers 30, 34 may be composed of a metal oxide, such as indium tin oxide.

The layers 32, 34 may function to increase the confinement of the guided optical signals of the TM mode component within the polarizer 16 and thereby reduce loss while also enabling a reduction in the footprint of the polarizer 16. The polarizer 16 is free of noble metals, such as gold or silver, and the fabrication of the polarizer 16 is fully compatible with complementary metal-oxide-semiconductor processes.

The layers 32, 34 may be formed as sidewall spacers by depositing a conformal layer of their constituent material over the polarizer 16, and patterning the conformal layer with lithography and etching processes to remove unmasked portions of the conformal layer. The etching process may be an anisotropic etching process, such as reactive ion etching. In an alternative embodiment, the unmasked portions of the conformal layer may be partially etched such that a thin layer of the constituent material of the layers 32, 34 is present on the dielectric layer 18 and connected to the base of the layers 32, 34.

The layers 32, 34 are absent from the sidewalls of the waveguide cores 12, 14 and, in the representative embodiment, are also absent from the side surfaces 19, 21 of the tapers 22, 24. The layers 32, 34 may have a uniform thickness over their respective lengths in a direction parallel to the longitudinal axis 26. In the representative embodiment, the layer 32 and the layer 34 have equal thicknesses. In an alternative embodiment, the layer 32 and the layer 34 may have unequal thicknesses provided by forming each separately. In an embodiment, the layers 32, 34 may be formed after the layers 28, 30 are formed. The respective bottom surfaces of the layers 32, 34 are in direct contact with the dielectric layer 18.

Figure 3:
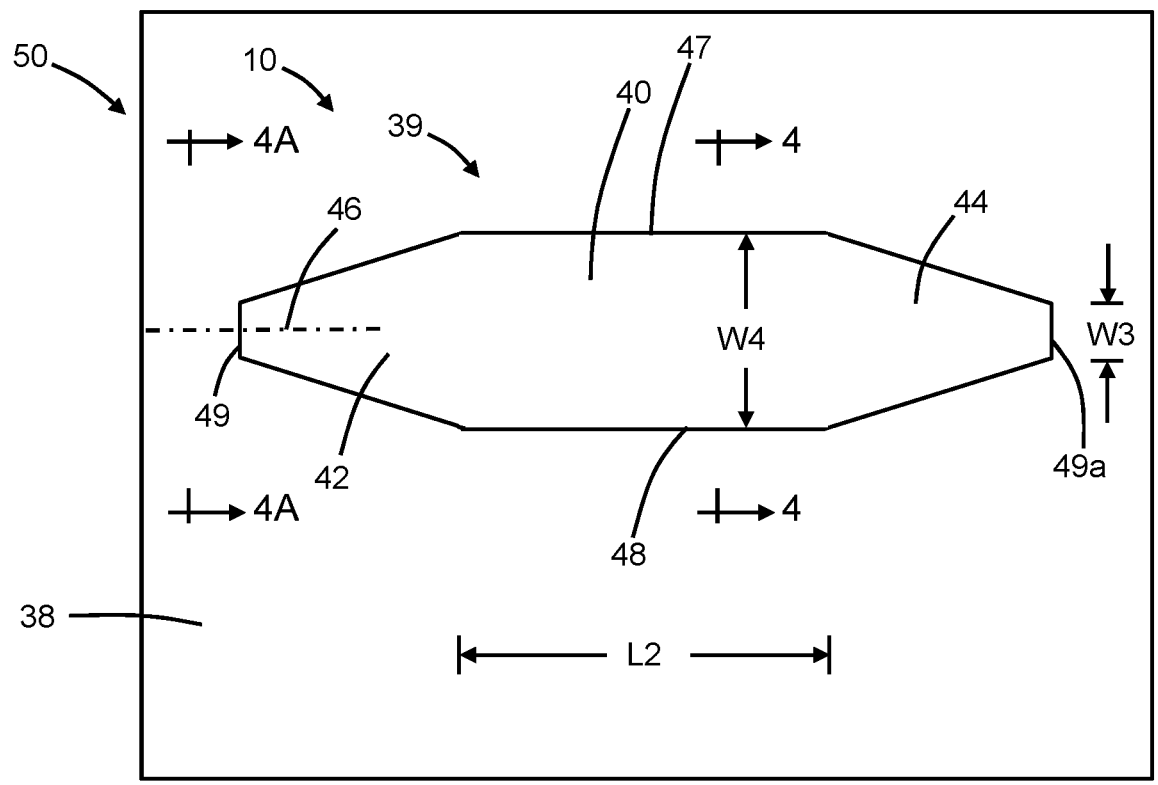
FIG. 3 is a diagrammatic top view of the structure at a fabrication stage of the processing method subsequent to FIG. 1.
Figure 4:
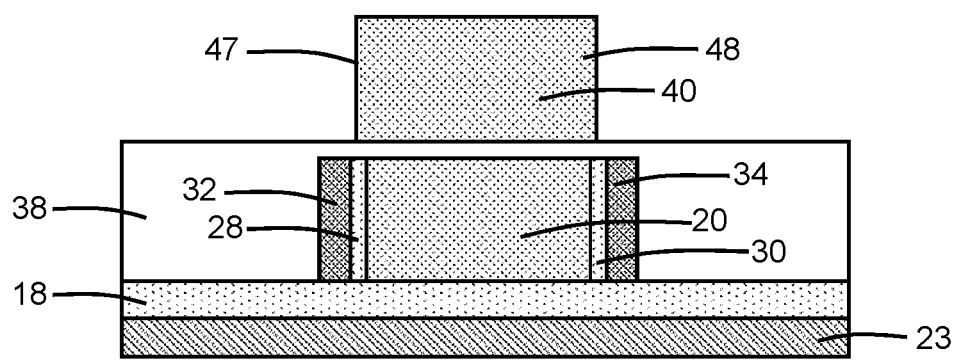
FIG. 4 is a cross-sectional view of the structure taken generally along line 4-4 in FIG. 3.
Figure 4A:
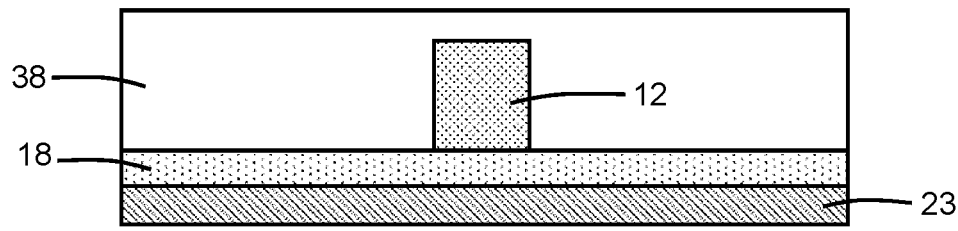
FIG. 4A is a cross-sectional view of the structure taken generally along line 4A-4A in FIG. 3.

With reference to FIGS. 3, 4, 4A in which like reference numerals refer to like features in FIGS. 1, 2, 2A and at a subsequent fabrication stage, a dielectric layer 38 is formed over the waveguide cores 12, 14 and polarizer 16. The dielectric layer 38 may be composed of a dielectric material, such as silicon dioxide, deposited by chemical vapor deposition and planarized with, for example, chemical mechanical polishing to remove topography. The waveguide cores 12, 14 and polarizer 16 are embedded and buried in the dielectric material of the dielectric layer 38.

A truncated waveguide core 39 is formed on the dielectric layer 38. The truncated waveguide core 39 is located in a different plane from the plane containing the polarizer 16 and with the dielectric layer 38 positioned as a low-index layer between the polarizer 16 and the truncated waveguide core 39. In an embodiment, the truncated waveguide core 39 may be formed by depositing a layer of its constituent material on the dielectric layer 38 and patterning the deposited layer with photolithography and etching processes. The truncated waveguide core 39 includes a section 40 that is positioned over the waveguide core 20 of the polarizer 16, a taper 42 that is positioned over the taper 22 of the polarizer 16, and a taper 44 that is positioned over the taper 24 of the polarizer 16. In an embodiment, the section 40 of the truncated waveguide core 39 may be positioned lengthwise directly over the waveguide core 20 of the polarizer 16, the taper 42 of the truncated waveguide core 39 may be positioned lengthwise directly over the taper 22 of the polarizer 16, and the taper 44 of the truncated waveguide core 39 may be positioned lengthwise directly over the taper 24 of the polarizer 16. In an alternative embodiment, one or both of the tapers 42, 44 may be omitted from the truncated waveguide core 39.

The truncated waveguide core 39 may extend lengthwise along a longitudinal axis 46. In an embodiment, the longitudinal axis 46 may be aligned parallel or substantially parallel to the longitudinal axis 26. The truncated waveguide core 39 may have opposite side surfaces 47, 48 that terminate at respective opposite ends 49, 49a to define a truncated shape. The truncated waveguide core 39 may be terminated over the polarizer 16 at the end 49 and may also be terminated over the polarizer 16 at the end 49a. In an embodiment, the section 40 of the truncated waveguide core 39 has a length, L2, that may be equal or approximately equal to the length, L1, of the waveguide core 20 of the polarizer 16. The section 40 of the truncated waveguide core 39 may have a width, W4, and the tapers 42, 44 may taper from the width, W4, at the respective interfaces with the opposite ends of the section 40 to a smaller width, W3, at the opposite ends 49, 49a. In the representative embodiment, the width, W4, of the section 40 of the truncated waveguide core 39 may be greater than the width, W2, of the waveguide core 20 of the polarizer 16. In alternative embodiments, the width, W4, of the section 40 of the truncated waveguide core 39 may be less than or equal to the width, W2, of the waveguide core 20 of the polarizer 16.

In an alternative embodiment, additional dielectric layers may be disposed over the dielectric layer 38 and positioned between the truncated waveguide core 39 and the dielectric layer 38. In an alternative embodiment, the truncated waveguide core 39 may be composed of a different material, such as polycrystalline silicon (i.e., polysilicon).

Laser light propagating with both transverse magnetic (TM) and transverse electric (TE) mode components may be guided on the photonics chip 50 by the waveguide core 12 to the polarizer 16. One mode component (e.g., the TE mode component) of the laser light experiences a high loss in the polarizer 16. The other mode component (e.g., the TM mode component) of the laser light may pass through the polarizer 16 with a low loss to be further guided on the photonics chip 50 by the waveguide core 14. The truncated waveguide core 39 may function to increase the extinction ratio of the polarizer 16 for improved removal of the unwanted mode component (e.g., the TE component), and may also reduce the insertion loss.

Figure 5:
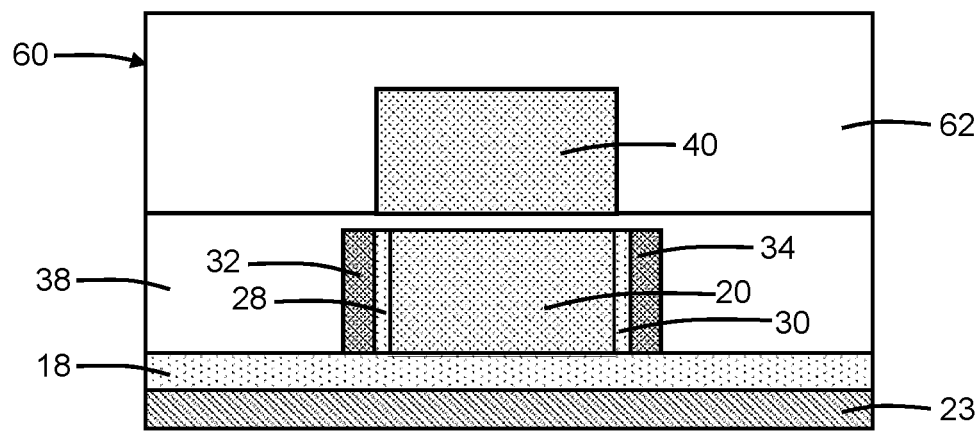
FIGS. 5, 5A are cross-sectional views of the structure at a fabrication stage subsequent to FIGS. 4, 4A.
Figure 5A:
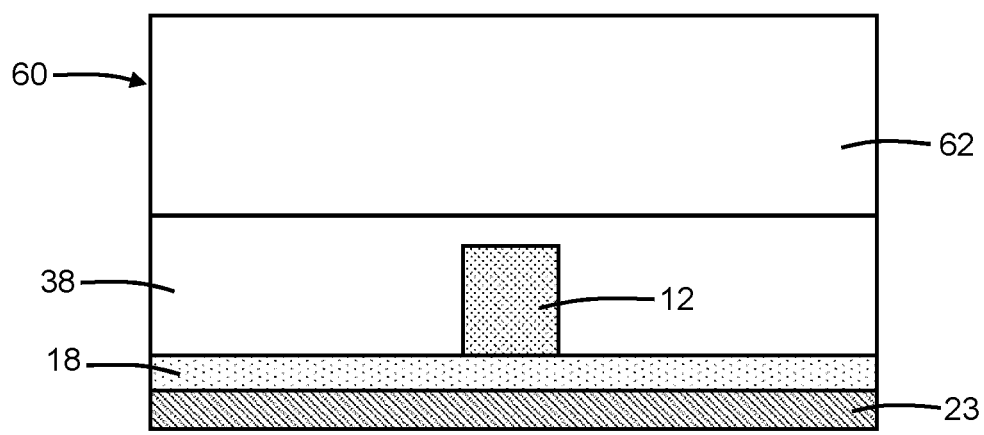

With reference to FIGS. 5, 5A in which like reference numerals refer to like features in FIGS. 4, 4A and at a subsequent fabrication stage, a back-end-of-line stack 60 is formed over the waveguide cores 12, 14, polarizer 16, and truncated waveguide core 39. The back-end-of-line stack 60 includes interlayer dielectric layers 62 composed of dielectric material, such as silicon dioxide, and metallization composed of a metal, such as copper or aluminum, that is arranged in the interlayer dielectric layers 62 to define metallization levels. In an embodiment, metallization may be absent from the back-end-of-line stack 60 in the space over the polarizer 16 and truncated waveguide core 39.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

In an alternative embodiment, the waveguide cores 12, 14 and polarizer 16 may be composed of a dielectric material (e.g., silicon nitride) and may be positioned in a metallization level of the back-end-of-line stack 60 with the truncated waveguide core 29 positioned in a higher metallization level of the back-end-of-line stack 60. In an alternative embodiment, the waveguide cores 12, 14 may be composed of a dielectric material (e.g., silicon nitride) and positioned in the back-end-of-line stack 60, the waveguide core 20 and tapers 22, 24 of the polarizer 16 may be composed of a single-crystal semiconductor material (e.g., single-crystal silicon), and respective couplers may be used to transfer the laser light from the waveguide core 12 to the polarizer 16 and, after polarization, from the polarizer 16 to the waveguide core 14. In an alternative embodiment, the waveguide cores 12, 14 may be composed of a single-crystal semiconductor material (e.g., single-crystal silicon), the waveguide core 20 and tapers 22, 24 of the polarizer 16 may be composed of a dielectric material (e.g., silicon nitride), and respective couplers may be used to transfer the laser light from the waveguide core 12 to the polarizer 16 and, after polarization, from the polarizer 16 to the waveguide core 14.

Figure 6:
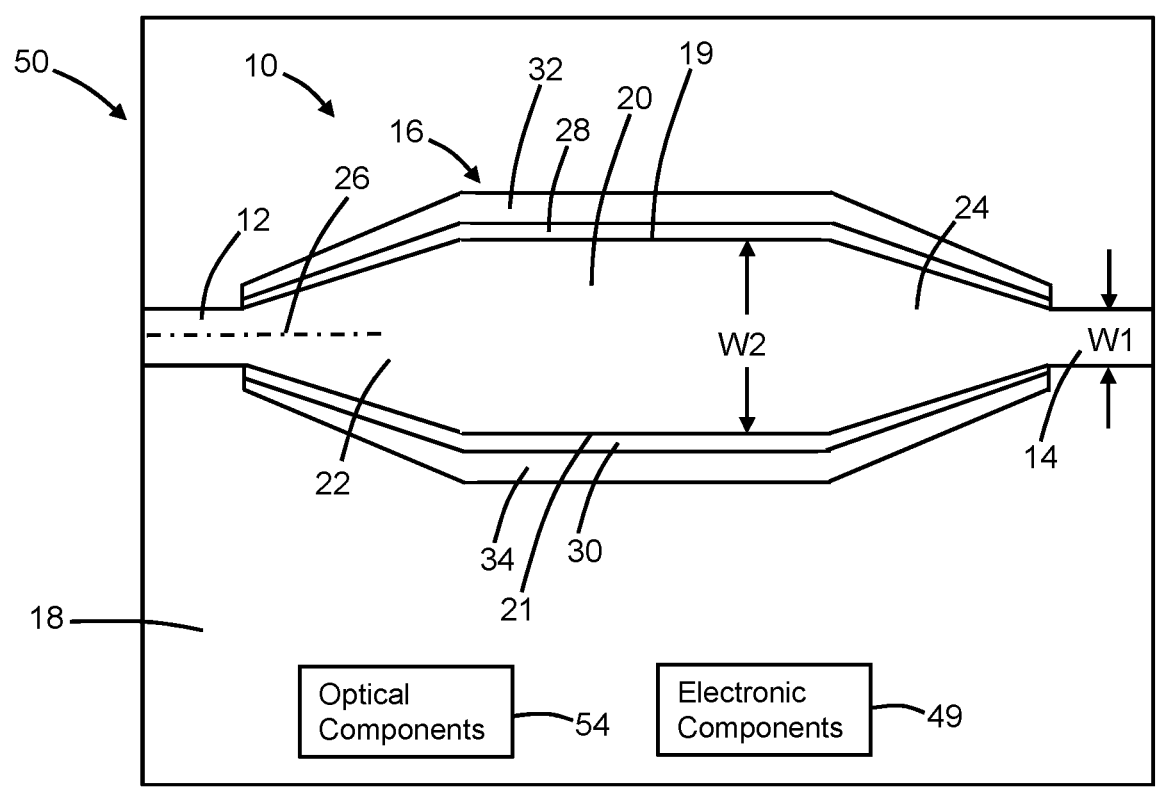
FIG. 6 is a top view of a structure in accordance with alternative embodiments of the invention.

With reference to FIG. 6 in which like reference numerals refer to like features in FIG. 1 and in accordance with alternative embodiments of the invention, the layers 28, 32 may be extended in length to be located adjacent to the side surface 19 of the tapers 22, 24, and the layers 30, 34 may be extended in length to be located adjacent to the side surface 21 of the tapers 22, 24. The layers 28, 32 and layers 30, 34 may terminate at or approximately at the interface defined by the intersection between the taper 22 and the waveguide core 12. The layers 28, 32 and layers 30, 34 may also terminate at or approximately at the interface defined by the intersection between the taper 24 and the waveguide core 14.

In an alternative embodiment, the layer 28 may be omitted such that the layer 32 is in direct contact with the side surface 19 of the waveguide core 20 and tapers 22, 24. In an alternative embodiment, the layer 30 may be omitted such that the layer 34 is in direct contact with the side surface 21 of the waveguide core 20. In an alternative embodiment, the layer 30 and the layer 34 may be omitted such that the side surface 21 of the waveguide core 20 and tapers 22, 24 is uncovered, and the polarizer 16 may only include the layers 28, 32 that are positioned adjacent to the side surface 19 of the waveguide core 20 and tapers 22, 24.

Figure 7:
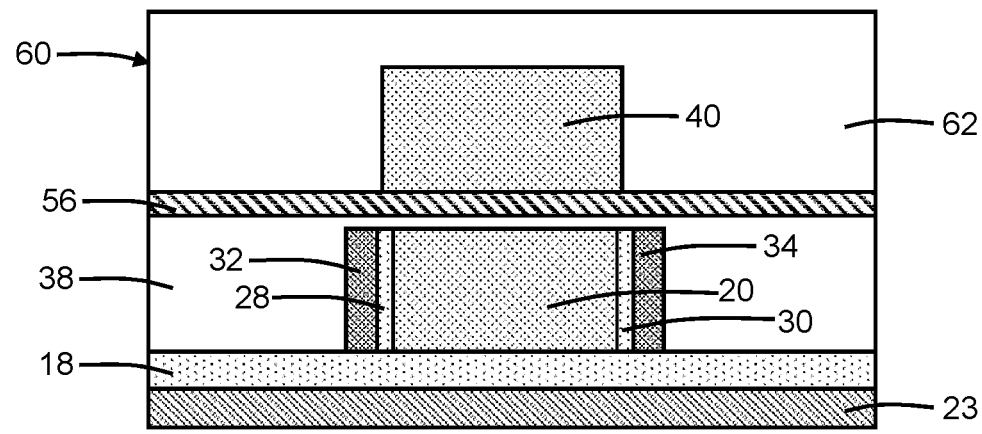
FIG. 7-8 are cross-sectional views of structures in accordance with alternative embodiments of the invention.

With reference to FIG. 7 in which like reference numerals refer to like features in FIG. 5 and in accordance with alternative embodiments of the invention, a dielectric layer 56 may be disposed on the dielectric layer 38 between the polarizer 16 and the truncated waveguide core 39. The dielectric layer 56 may be composed of a dielectric material, such as silicon nitride, and may not be patterned in contrast to the deposited layer used to form the truncated waveguide core 39.

Figure 8:
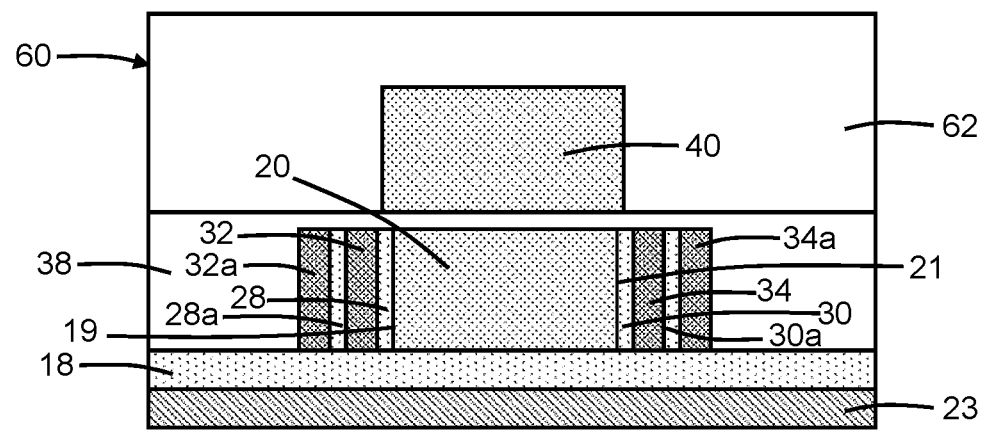

With reference to FIG. 8 in which like reference numerals refer to like features in FIG. 5 and in accordance with alternative embodiments of the invention, an additional layer 32a similar to the layer 32 may be provided adjacent to the side surface 19 of the waveguide core 20, and an additional layer 34a similar to the layer 34 may be provided adjacent to the side surface 21 of the waveguide core 20. An additional layer 28a similar to layer 28 may be provided laterally as a separator between layer 32 and layer 32a. An additional layer 30a similar to layer 30 may be provided as a separator laterally between layer 34 and layer 34a. In an alternative embodiment, the layers 28, 30, layers 28a, 30a, layers 32, 34, and layers 32a, 34a may be extended in length along the side surfaces 19, 21 of the tapers 22, 24, as shown in FIG. 6. In an alternative embodiment, the layers 30, 34 may be omitted to provide direct contact between the side surfaces 19, 21 and the layers 32, 34 closest to the side surfaces 19, 21.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a polarizer including a first waveguide core and a first layer, the first waveguide core having a first side surface, the first layer positioned adjacent to the first side surface of the first waveguide core, and the first layer comprising a first material having a permittivity with an imaginary part that ranges from 0 to about 15; and
a second waveguide core positioned over the polarizer, the second waveguide core including a first end, a second end opposite to the first end, a first taper that terminates the second waveguide core at the first end, and a second taper that terminates the second waveguide core at the second end, and the second waveguide core comprising a second material that is different in composition from the first material.

2. The structure of claim 1 further comprising:
a dielectric layer positioned between the polarizer and the second waveguide core.

3. The structure of claim 1 wherein the first waveguide core has a first width, and further comprising:
a third waveguide core coupled to the first waveguide core,
wherein the third waveguide core has a second width, the first width is greater than the second width, and the second waveguide core has a third width that is greater than the second width.

4. The structure of claim 1 wherein the second waveguide core includes a section connected to the first taper, and the first taper and the section of the second waveguide core are positioned directly over the polarizer.

5. The structure of claim 4 wherein the polarizer includes a taper coupled to the first waveguide core, the first taper of the second waveguide core is positioned directly over the taper of the polarizer, and the section of the second waveguide core is positioned directly over the first waveguide core of the polarizer.

6. The structure of claim 4 wherein the second taper of the second waveguide core is directly connected to the first taper by the section, and the second taper of the second waveguide core is positioned directly over the polarizer.

7. The structure of claim 6 wherein the polarizer includes a first taper and a second taper that is directly connected to the first taper by the first waveguide core.

8. The structure of claim 7 wherein the first taper of the second waveguide core is positioned directly over the first taper of the polarizer, the second taper of the second waveguide core is positioned directly over the second taper of the polarizer, and the section of the second waveguide core is positioned directly over the first waveguide core of the polarizer.

9. The structure of claim 8 wherein the first waveguide core has a first length, the section of the second waveguide core has a second length, and the first length is approximately equal to the second length.

10. The structure of claim 9 wherein the section of the second waveguide core is wider than the first waveguide core.

11. The structure of claim 1 wherein the polarizer includes a second layer positioned between the first layer and the first side surface, and the second layer is comprised of silicon dioxide.

12. The structure of claim 1 wherein the first material is a metal vanadate, the second waveguide core comprises single-crystal silicon, and the second material is silicon nitride or polysilicon.

13. The structure of claim 1 wherein the first material is calcium vanadate or strontium vanadate, the second waveguide core comprises single-crystal silicon, and the second material is silicon nitride or polysilicon.

14. The structure of claim 1 wherein the polarizer includes a second layer comprised of the first material, the first waveguide core has a second side surface, and the second layer is positioned adjacent to the second side surface of the first waveguide core.

15. The structure of claim 14 wherein the polarizer includes a third layer positioned between the first layer and the first side surface, a fourth layer positioned between the second layer and the second side surface, and the third layer and the fourth layer are comprised of silicon dioxide.

16. The structure of claim 1 wherein the first layer is in direct contact with the first side surface of the first waveguide core.

17. The structure of claim 1 wherein the polarizer includes a second layer and a third layer positioned between the second layer and the first layer, and the third layer is comprised of silicon dioxide, and the second layer is comprised of the first material.

18. A method comprising:
   forming a polarizer including a first waveguide core and a layer that is positioned adjacent to a side surface of the first waveguide core; and
   forming a second waveguide core positioned over the polarizer,
   wherein the second waveguide core includes a first end, a second end opposite to the first end, a first taper that terminates the second waveguide core at the first end, and a second taper that terminates the second waveguide core at the second end, the layer comprises a first material having a permittivity with an imaginary part that ranges from 0 to about 15, and the second waveguide core comprises a second material that is different in composition from the first material.

19. The method of claim 18 wherein the first material is a metal vanadate.

20. The method of claim 18 wherein a dielectric layer is formed between the polarizer and the second waveguide core.

* * * * *